Patented Oct. 20, 1953

2,656,274

UNITED STATES PATENT OFFICE 2,656,274

PROCESSES FOR THE PRODUCTION, CONCENTRATION AND STABILIZATION OF FAT-SOLUBLE VALUABLE SUBSTANCES FROM CARROTS AND THE RESULTING PRODUCT

Friedrich Tiedt, Otterndorf, and Roderich Dewald, Wiesbaden, Germany

No Drawing. Application October 25, 1950, Serial No. 192,144. In Germany October 31, 1949

17 Claims. (Cl. 99—11)

This invention relates to processes for the production, concentration, and stabilization of valuable fat-soluble substances from carrots, and for increasing the stability and the physiological value of such substances.

It is known that carrots contain substances having valuable physiological properties. Various attempts have been made to extract these valuable substances from carrots, either in a pure form or in a concentrated form. Such work has been concerned almost exclusively with the extraction of the carotene contained in the carrot.

In one of these known processes, for example, the carrots are disintegrated, the mass being then dried in vacuo, and then digested with alcohol for a number of hours in a nitrogen atmosphere containing an addition of NaOH. After cooling and filtration, the filtrate is neutralized and the alcohol evaporated off. The carotene is then recovered by re-crystallization from the syrup thus obtained. Alternatively, the soaps may be dissolved in water and the carotene thereafter extracted with benzene or petroleum ether. In another process, the carrot juice obtained by disintegration and pressing out is centrifuged and the residue thus separated from the clarified liquor is treated with oil after drying. A process has also been proposed for the extraction of carotene coloring substances, in which disintegrated carrots are treated with amino salts or quaternary ammonium compounds which contain at least one higher aliphatic residue, and the coloring substances then taken out with organic solvents.

A process for the production of carotene concentrates from dried and disintegrated carrots is also known, in which the carrots are treated with boiling isopropyl alcohol and the extract concentrated; while in a further known process, for the production of stable aqueous colloidal carotene solutions, pectin is added to the solutions as a protective colloid.

It has also been proposed to boil fresh chopped carrots with exclusion of air, in which process the albuminous substances in the cell are coagulated and absorb all the carotene. Thereafter, upon pressing, a press cake remains which is dried with acetone and then extracted with petroleum ether. In another process, dried carrots are treated with benzene. The solution is then concentrated, the carotene partially crystallizing out. The solvent is completely removed from the mother solution and the residue is employed as a carotenous base for ointment.

In another process, pure carotene is obtained by drying fresh moist carrots with dehydrated sodium sulphate or gypsum, extracting the dry material and leaving the concentrated extract for a number of days, during which carotene crystallizes out.

Finally, it is known to extract carotene or vitamin containing preparations from vegetable substances by treating such substances with NaOH or the like, heating the mixture with steam and then extracting it by means of petroleum ether or the like. The extract is freed from the fibrous materials and then steam-distilled in the presence of an anti-oxidation medium, after which the aqueous residue is extracted with coconut oil or the like.

These known processes are both costly and complicated. In cases where dried materials are used as starting substances, it must also be borne in mind that considerable quantities of vitamins, especially carotenes, are destroyed in any drying process that observes manufacturing economies. If an expressing process, such as pressing or centrifuging, is applied to fresh materials, a more or less large percentage of the valuable active substances remains in the residues from the pressing and centrifuging. Both types of process therefore give poor yields. In cases where in the known processes the fresh disintegrated material is extracted from the skeleton substance without previous separation of the juice, this is effected with the aid of chemicals, whereby at least the danger arises that the end product cannot be regarded as the same which consists in nature.

It has recently been found that synergistic relations appear to exist between pro-vitamin A (carotene) and vitamin E (tocopherol). Carotene is known to be extremely sensitive to oxygen in the air. Its behavior in solvents (fats) having a tendency to autoxidation does not seem to be clearly explained by the known results of experiments, which in many respects are contradictory. In any case, one remarkable feature of carotene is its stability in the carrot. According to the most recent work, it is to be assumed that this stability is due to a natural system of active substances which is present in the carrot and to the anti-oxidizing action of tocopherol.

In the known processes, the natural stabilizing system of such active substances which is present in the carrot is substantially destroyed.

The object of the present invention is to effect a cheap and simple process for the recovery, concentration, and stabilization of this fat-soluble system of active substances in as careful a manner as possible, while increasing the yield of carotene; to produce a preparation of the greatest possible natural purity while avoiding chemical reagents in the recovery of the concentrate; to employ extraction fats, oils or the like which are present in the natural form in the fats, oils, emulsions and the like which may subsequently be treated with the concentrate, and to provide an improvement of the physiological value and stability of the fats, oils, emulsions and the like treated with the concentrate obtained.

It has been found that the disadvantages hereinbefore described are avoided and advantages are obtained if fresh carrots are disintegrated as finely as possible, the material obtained is directly extracted under conditions of emulsification with oils and the phases obtained are separated. The fatty phase can then be further worked up or directly delivered to the fats, oils or the like to be treated.

Extremely fine disintegration of the carrots is essential in order to obtain a good yield, and such disintegration may be carried out, in the presence of the solvent, by means, for example, of a cross beater mill, a hammer mill, a colloid mill or the like; or it may advantageously be performed by or in conjunction with supersonic vibrations.

In order to produce naturally pure concentrates, the very finely disintegrated carrots are directly emulsified with the solvents for oils, fats or the like which are employed, it being unnecessary in this case to employ emulsifiers or other chemicals; the emulsification can be effected simply by intimate mixing of the materials.

By the emulsification on the one hand and the mechanical stirring or mixing on the other, the greatest increase in the surface of the solvent permissible, having regard to the further working up and the best possible distribution of the phases is obtained, with the result that rapid and almost complete passage of the substances to be recovered into the solvent is rendered possible. In order to permit economical performance of the process, care must be taken that the particle size is correct, and this must be ascertained empirically in accordance with the raw materials employed and the particular method adopted. With too coarse a division, an unfavorable extraction would be obtained and with too fine a particle size the subsequent phase separation would be difficult. In the process of dissolution, the emulsion need only remain in one place for fractions of a second, but it may remain longer. If desired, the correct particle size is determined in the normal manner, for example with a micrometer or by counting in a counting chamber.

In order to obtain the most favorable consistency for the material to be extracted, water, carrot juice, emulsions already obtained or quantities of the aqueous phase or of the skeleton carrier substance, may be added thereto according to requirement. Moreover, quantities of the fatty phase may be admixed with the material if it is desired to obtain a higher concentration.

The separation of the emulsion obtained into its phases, i. e. skeleton substances, aqueous juice residue and enriched solvent, may be carried out in various ways, for example by allowing the emulsion to settle after corresponding movement, the individual particles being discharged and then combined and the phases separated from one another by electrical forces (flow potential and the potential of falling particles). The separation may also be effected or supplemented by other separate or combined steps, for example by pressing, filtration, centrifuging or the application of mechanical oscillations.

Good results are obtained if, for example, the disintegration of the carrots and/or the emulsification and/or the phase separation are effected by means of mechanical oscillations, e. g. supersonic vibration, in which case the disintegration may take place in the presence of the extraction oil.

In addition to the valuable active substances which are contained in the fatty phase, this phase also contains all other fat-soluble components present in the raw material, especially the volatile oils. If these interfere with the sense perception they may be removed by means of an inert gas, for example water vapor.

The process according to the invention can be advantageously carried out either continuously or discontinuously. By it, a cheap and simple concentration of all fat-soluble active substances is effected in as careful a manner as possible and practically without loss, while all the important synergistic relations are maintained.

It is known that carotene is not only valuable as a physiological factor, but also as a coloring substance for fats and fat-containing foodstuffs. For example, summer butter has a more intense yellow color than winter butter owing to its higher carotene content. It has already been proposed to color butter with natural or synthetic coloring substances. It is also known to add carotene to winter butter, whereby it is not only made to resemble summer butter in its color, but its vitamin action is also improved. In the coloring methods hitherto normally adopted, the coloring substance employed is generally applied in solution in oil, whereby constituents not originally present in material quantities are added to the butter, which addition is strictly to be regarded—also from the viewpoint of food regulations—as an adulteration. It is partly due to these additions that the coloring of butter is by no means accompanied by an improvement in the taste and stability of the butter, but frequently results in a deterioration thereof (see "Sudd. Molkereizeitung," 1949, p. 1183).

It has been found that all these disadvantages are avoided if, in the extraction of the active substance according to the present invention, a fat, oil or the like is used as extraction medium, which is contained in the products subsequently to be treated themselves, for example butter fat in the case where the product subsequently to be treated is butter. Thus it is achieved in contrast to the known art, that the end product contains only natural constituents in addition to the active substances to be incorporated. The valuable substances, or the system of active substances, obtained in accordance with the invention are then present in the treated substance in the form in which they are present in the original starting material, for example in the carrot, with their synergistic relations. Thus, the stability and the physiological value of the substance treated, for example butter, are increased.

The process according to the invention can be carried out in the following manner, for example, with good results:

*Example 1*

10 kg. of cleaned carrots are cut up and at once finely disintegrated in a hammer mill, a cross beater mill or the like. The pulp obtained is heated to 50° C. and emulsified with 1.5 kg. of butter fat for 15 minutes in a high-speed agitating machine. The mass thus obtained is pressed off on a filter cloth in a hydraulic press. The liquid obtained to a large extent separates automatically owing to the filtration and the electric discharge which occurs. The phases are completely separated by means of a centrifuge. The volatile oil is then driven off with steam and separately recovered. The valuable substances are enriched with butter fat to seven times the richness of the starting material. The yield is practically quantitative if a high pressing force is applied. The enriched butter fat is added to the extent of about 1% to a butter in statu nascendi in a butter finisher.

The process described can be carried out with similar results with, for example, the following modifications:

1. Temperatures of from 32° C. (melting point of butter fat) may be employed.
2. The fat addition can be varied within any desired limits according to concentration; in this case, however, the lower limit depends, with a view to a satisfactory yield, upon the emulsifying process applied.
3. If lower pressures are applied, the pressing residue must be re-emulsified with previously produced juice and subjected to a second pressing in order to avoid fat losses and consequently carotene losses, or the residues can be extracted in known manner with volatile solvents. After elimination of the solvent by evaporation, the concentrate thus obtained can be employed, for example, in cosmetics.
4. The volatile oil can also be driven off with an inert gas, for example nitrogen, carbon dioxide or the like, and at superatmospheric or subatmospheric pressure.
5. If higher concentrations are employed, the percentage being formed of concentrate to be added to the butter is accordingly reduced.

Example 2

Cleaned carrots are passed through a mincing machine or pre-cut into pieces of about 3 cm. The disintegrated material is treated as in the first example, but in a continuous process and with this difference that instead of butter fat, olive oil previously enriched with carotene is employed and a quantity of liquid phase is added for purposes of dilution. By this method, an almost quantitative yield is obtained with a particle size, as regards the great majority of all of the fatty particles, of between 1 and 15μ, the particle size being determined by means of a micrometer. The enriched olive oil is added, to the extent of about 10%, to a pulp, ointment, liquid emulsions or the like.

In the foregoing examples, the mechanical disintegration and/or emulsification and/or phase separation can also be carried out by mechanical vibrations, by means of a liquid pipe, a low-frequency vibrator, a high-frequency, quartz oscillator, a magnetostrictive oscillator or by any other usual means, these means being employed either separately or in combination with one another, or with other devices known per se. The emulsification can also take place in a kneader or any other emulsifying apparatus. The pressing can be effected by means of a screw press, a spindle press or a filter press or the like, or it may be omitted if, as in the case for example of disintegration in a colloid mill, the solid particles are so small that the separation of the three phases is achieved in a centrifuge. The phases may also be separated by any other means, for example by filtration, overflow, drawing off as by decantation or the like.

What we claim as our invention and desire to secure by Letters Patent of the United States is:

1. A process for the production, concentration and stabilization of pro-vitamin A, vitamin E, anti-oxidants and like fat-soluble valuable substances from carrots, with maintenance of their mutual synergistic relations, and for increasing the stability and physiological value of a fatty base material treated therewith, said process consisting in the steps of finely disintegrating fresh carrots; emulsifying the thus obtained disintegrated material with a fatty emulsifying agent by intimately mixing the same therewith at a temperature at which the said emulsifying agent is fluid; pressing the resultant mixture to separate the phases of liquids from the solids, separating the fat phase of the liquid thus obtained, and incorporating said fat phase with the substance to be treated.

2. A process as specified in claim 1, wherein the disintegration of the carrots is effected by mechanical agitation.

3. A process as specified in claim 1, wherein the emulsification is effected by mechanical agitation.

4. A process as specified in claim 1, wherein the phase separation is effected by mechanical agitation.

5. A process as specified in claim 1, wherein the disintegration of the carrots is effected by supersonic vibration.

6. A process as specified in claim 1, wherein the emulsification is effected by supersonic vibration.

7. A process as specified in claim 1, wherein the phase separation is effected by supersonic vibration.

8. A process as specified in claim 1, wherein the operations of disintegration, emulsification, and phase separation are effected by mechanical agitation.

9. A process for the production, concentration and stabilization of pro-vitamin A, vitamin E, anti-oxidants and like fat-soluble valuable substances from carrots, with maintenance of their mutual synergistic relations, and for increasing the stability and physiological value of a fatty material treated therewith, said process consisting of increasing the vitamin content of a fatty material which consists in finely disintergrating fresh carrots; emulsifying the resultant disintegrated carrot material with a fatty emulsifying agent by intimately admixing the same therewith, said emulsifying agent being naturally present in the fatty material treated, pressing the mixture to separate the liquid phase from the solid fat phase thereof, separating the phases of the liquid obtained by the last pressing action, and incorporating said fat phase of the liquid obtained in this manner with the fatty material to be treated.

10. A process according to claim 9, in which the disintegration of the carrot is accomplished by mechanical agitation.

11. A process according to claim 9, in which the emulsifying of the disintegrated material with the oleaginous agent is accomplished by mechanical agitation.

12. A process according to claim 9, in which the separation of the liquid phase is accomplished solely by mechanical agitation.

13. A process according to claim 9, in which the several operations of disintegration of the carrots, emulsification thereof with an oleaginous agent, and the separation of the phases of the liquid obtained during the emulsification are all accomplished by mechanical agitation.

14. A process of the character disclosed comprising; comminuting fresh carrots to a pulp, emulsifying the pulp thus obtained by agitation of the same with butterfat at a temperature of about 32° C. to 52° C., separating the liquid material from the bulk material of the carrot, separating the fatty phase of the liquid therefrom, and admixing the resultant separated fatty phase with butter.

15. A process as set forth in claim 14, wherein the butterfat is replaced by olive oil, and the fatty phase is employed in the treatment of materials containing olive oil.

16. A product made in accordance with the process of claim 1.

17. A product made in accordance with the process of claim 9.

FRIEDRICH TIEDT.
RODERICH DEWALD.

References Cited in the file of this patent

UNITED STATES PATENTS

| Number | Name | Date |
|---|---|---|
| 2,032,165 | Barnett et al. | Feb. 25, 1936 |
| 2,131,394 | Test | Sept. 27, 1938 |